US009665643B2

(12) United States Patent
Li et al.

(10) Patent No.: US 9,665,643 B2
(45) Date of Patent: May 30, 2017

(54) KNOWLEDGE-BASED ENTITY DETECTION AND DISAMBIGUATION

(75) Inventors: Kang Li, Sammamish, WA (US); Yi Li, Issaquah, WA (US); Yiping Zhou, Sunnyvale, CA (US); Zhengdong Lv, Beijing (CN); Yohn Cao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 362 days.

(21) Appl. No.: 13/340,722

(22) Filed: Dec. 30, 2011

(65) Prior Publication Data

US 2013/0173604 A1 Jul. 4, 2013

(51) Int. Cl.
*G06F 17/30* (2006.01)

(52) U.S. Cl.
CPC .. *G06F 17/30687* (2013.01); *G06F 17/30864* (2013.01)

(58) Field of Classification Search
CPC ......... G06F 17/30699; G06F 17/30525; G06F 17/30616; G06F 17/30011; G06F 17/30038; G06F 17/3064; G06F 17/30696; G06F 17/30864; G06F 17/30867; G06F 17/3097; G06F 17/30; G06F 17/278; G06F 17/2735; G06F 17/2785; Y10S 707/99933; Y10S 707/99931
USPC ....................................................... 707/723
See application file for complete search history.

(56) References Cited

U.S. PATENT DOCUMENTS

| | | |
|---|---|---|
| 6,301,584 B1 | 10/2001 | Ranger |
| 6,990,238 B1 | 1/2006 | Saffer et al. |
| 7,299,222 B1 | 11/2007 | Hogan et al. |
| 7,346,613 B2 | 3/2008 | Hurst-Hiller et al. |
| 7,386,545 B2 | 6/2008 | Ashutosh et al. |
| 7,617,202 B2 | 11/2009 | Brill et al. |

(Continued)

FOREIGN PATENT DOCUMENTS

| | | |
|---|---|---|
| CN | 101454750 A | 6/2009 |
| WO | 2008037848 A1 | 4/2008 |

(Continued)

OTHER PUBLICATIONS

Bouquet, et al., "An Entity Name System for Linking Semantic Web Data", Retrieved at <<http://citeseerx.ist.psu.edu/viewdoc/download?doi=10.1.1.128.2714&rep=rep1&type=pdf>>, Atti di: Linked Data on the Web (LDOW), Apr. 22, 2008, pp. 10.

(Continued)

*Primary Examiner* — Merilyn Nguyen
(74) *Attorney, Agent, or Firm* — Jessica Meyers; Tom Wong; Micky Minhas (57) ABSTRACT

An entity-based search system is described herein that detects and recognizes entities in Internet-based content and uses this recognition to organize search results. The system associates one or more entity identifiers with a web page and stores this information as metadata of the page in a search engine index. This metadata will enable entity-based queries as well as rich data presentations in a search engine result page (SERP), including grouping results by entities, filtering results by one or more particular entities, or re-ranking search results based on user preference of entities. Thus, the entity-based search system allows users to identify a particular entity the user is interested in finding, and to receive search results directly related to that entity.

23 Claims, 4 Drawing Sheets

(56) References Cited

U.S. PATENT DOCUMENTS

| | | | |
|---|---|---|---|
| 7,657,522 B1 | 2/2010 | Puzicha et al. | |
| 7,685,141 B2 | 3/2010 | Jadhav et al. | |
| 7,761,436 B2 | 7/2010 | Norton et al. | |
| 7,765,236 B2 | 7/2010 | Zhai et al. | |
| 7,769,740 B2 | 8/2010 | Martinez et al. | |
| 7,792,864 B1* | 9/2010 | Rice | G06F 17/30592 707/791 |
| 7,814,085 B1 | 10/2010 | Pfleger et al. | |
| 7,818,315 B2 | 10/2010 | Cucerzan et al. | |
| 8,024,331 B2 | 9/2011 | Calistri-Yeh et al. | |
| 8,145,618 B1 | 3/2012 | Pfleger et al. | |
| 8,224,857 B2 | 7/2012 | Doganata et al. | |
| 8,458,171 B2* | 6/2013 | Wu | G06F 17/30672 707/723 |
| 8,495,046 B1* | 7/2013 | Buchanan | G08G 1/0133 701/426 |
| 8,627,270 B2 | 1/2014 | Fox et al. | |
| 9,069,822 B2 | 6/2015 | Qiu et al. | |
| 2002/0194201 A1 | 12/2002 | Wilbanks et al. | |
| 2003/0220913 A1 | 11/2003 | Doganata et al. | |
| 2005/0222977 A1 | 10/2005 | Zhou et al. | |
| 2006/0005124 A1 | 1/2006 | Speicher | |
| 2006/0047673 A1 | 3/2006 | Molander et al. | |
| 2006/0212362 A1 | 9/2006 | Donsbach et al. | |
| 2006/0277176 A1* | 12/2006 | Liao | G06Q 10/10 |
| 2007/0038616 A1 | 2/2007 | Guha | |
| 2007/0094171 A1 | 4/2007 | Burges et al. | |
| 2007/0233656 A1* | 10/2007 | Bunescu et al. | 707/3 |
| 2008/0005118 A1 | 1/2008 | Shakib et al. | |
| 2008/0082506 A1 | 4/2008 | Saito et al. | |
| 2008/0215543 A1 | 9/2008 | Huang et al. | |
| 2008/0222105 A1* | 9/2008 | Matheny | 707/3 |
| 2008/0306908 A1 | 12/2008 | Agrawal et al. | |
| 2009/0089083 A1 | 4/2009 | Paradis et al. | |
| 2009/0144609 A1* | 6/2009 | Liang et al. | 715/230 |
| 2009/0171813 A1 | 7/2009 | Byrne et al. | |
| 2009/0182725 A1 | 7/2009 | Govani et al. | |
| 2009/0265338 A1 | 10/2009 | Kraft et al. | |
| 2009/0307056 A1* | 12/2009 | Park | G06Q 30/02 707/709 |
| 2009/0319508 A1 | 12/2009 | Yih et al. | |
| 2010/0050211 A1 | 2/2010 | Seldin et al. | |
| 2010/0098343 A1 | 4/2010 | Perronnin et al. | |
| 2010/0179874 A1 | 7/2010 | Higgins et al. | |
| 2010/0198837 A1 | 8/2010 | Wu et al. | |
| 2010/0235340 A1 | 9/2010 | Todhunter et al. | |
| 2010/0293195 A1* | 11/2010 | Houghton | G06F 17/241 707/776 |
| 2011/0004529 A2 | 1/2011 | Finn et al. | |
| 2011/0078554 A1 | 3/2011 | Nie et al. | |
| 2011/0103699 A1 | 5/2011 | Ke et al. | |
| 2011/0106782 A1 | 5/2011 | Ke et al. | |
| 2011/0106798 A1 | 5/2011 | Li et al. | |
| 2011/0119270 A1 | 5/2011 | Jin et al. | |
| 2011/0131241 A1* | 6/2011 | Petrou | G06F 17/30861 707/770 |
| 2011/0137910 A1 | 6/2011 | Hibino et al. | |
| 2011/0208724 A1 | 8/2011 | Jones et al. | |
| 2011/0225155 A1 | 9/2011 | Roulland et al. | |
| 2011/0252012 A1 | 10/2011 | Kanduri et al. | |
| 2011/0270674 A1 | 11/2011 | Cosman | |
| 2011/0283205 A1 | 11/2011 | Nie et al. | |
| 2011/0295775 A1 | 12/2011 | Wang et al. | |
| 2011/0299743 A1 | 12/2011 | Ke et al. | |
| 2011/0320411 A1* | 12/2011 | Henderson | G06F 17/30575 707/687 |
| 2012/0158738 A1* | 6/2012 | Buehrer | G06F 17/30867 707/748 |
| 2012/0263386 A1 | 10/2012 | Schlosser et al. | |
| 2012/0303664 A1 | 11/2012 | Apacible et al. | |
| 2013/0110825 A1* | 5/2013 | Henry | G06F 17/3053 707/723 |
| 2015/0058328 A1* | 2/2015 | Fu | G06F 17/30241 707/723 |

FOREIGN PATENT DOCUMENTS

| | | |
|---|---|---|
| WO | 2009/052277 A1 | 4/2009 |
| WO | 2011054002 A2 | 5/2011 |
| WO | 2011143154 A2 | 11/2011 |

OTHER PUBLICATIONS

Chakrabarti, et al., "Enhancing Search with Structure", Retrieved at <<http://sites.computer.org/debull/A10mar/soumen-paper.pdf>>, Bulletin of the IEEE Computer Society Technical Committee on Data Engineering, 2010, pp. 1-13.

Tsoukalas, et al., "PLEDS: A Personalized Entity Detection System Based on Web Log Mining Techniques", Retrieved at <<http://ieeexplore.ieee.org/stamp/stamp.jsp?tp=&arnumber=4597039>>, The Ninth International Conference on Web-Age Information Management (WAIM), Jul. 20-22, 2008, pp. 389-396.

International Search Report, mailed Apr. 8, 2013, received in Application No. PCT/US2012/069604.

Search Engine Research Papers, 2004 Brandway Corp., Jul. 2, 2005, downloaded Feb. 24, 2010, http://search-engine--optimizatIon.ecommercehosts.com/SEO-referenceslresearchnaners.htm, 14 pages.

Filter Search Results, 2010 Google. downloaded Feb. 24, 2010 httn:/lwww.lmof!le.com/suuDortiadulannerlbinlanswer.Dv?hl=en&answer=98223 1 page.

Lv et al., "Perret: AToolkit for Content-Based Similarity Search ofFeature-Rich Data," EuroSys '06, Apr. 18-21, 2006, Leuven, Belgium, http://www.cs.princeton.edulcass/paperslFerret.pdf, 14 pages.

Yu-Feng, et al.,—Improving Information Retrieval System by Co-clustering Web Documents and Queries, Retrieved at <<http://www.aicit.org/aissIppllAISS%20vol3%20issue8_32.pdf>>,Proceedings of Advances in Information Sciences and Service Sciences (AISS), vol. 3, No. 8, Sep. 2011.

Wen, et al. "Query Clustering in the Web Context", Retrieved at http://research.microsoft.comJen-uslumJpeopie/jrwenljrwen_fileslpublicationsIQC-CIR.pdf>> , 2002.

Bian, et al., "Ranking Specialization for Web Search: A Divide-and-Conquer Approach by Using Topical RankSVM"Retrieved at <<ht1p:lllabs.yahoo.com/files/fpOB42-bian.pdf>>, Apr. 26-30, 2010.

Lee, et al., "Ke-ranJ<mg moael Dasea on aocument Clusters", Ketnevea at <<nttp:llwww.google.co.InJum'sa=t&rct=j&q=re-ranking%20model%20based%200n%20documentok2Oclusters&source=web&cd=1 &ved=OCBwQFjAA&url=http%3A%2F%2Fciteseerx.ist.psu.edu%2Fviewdoc%2Fdownload%3Fdoi%3D10.1.1.94.9049%26rep%3Drep1%26type% undated 3Dpdf&ei=nePFTo6NCBK4rAeCqY37Cw&usg=AFQJCNFAKMIZJQlgee8kce8jscjORznDGw>>.

Puppin, et al., "The QueryVector Document Modell" Retrieved at <<http://hpc.istLcnr.itl-diego/paperslcikm472-puppin.pdf>>, Nov. 5-11, 2006.

Dai, et al., Learning to Rank for Freshness and Relevancell, Retrieved at <<http://research.microsoft.com/pubsl150747/Dai2011.pdf>>, Jul. 24-28, 2011.

International Search Report, mailed Apr. 8, 2013, received in Application No. PCT/US20121069604.

Bouquet, et al., "An Entity Name System for linking Semantic Web Data", Retrieved at <<hUp:llciteseerx.islpsu.edu/viewdocldownload?doi=10.1.1.128.2714&rep=rep1&type=pdf>>, Atti di: Linked Data on the Web (LDOW), Apr. 22, 2008, pp. 10.

Chakrabarti, et al., "Enhancing Search with Structure", Retrieved at <<http://sites.computer.org/debull/A10mar/soumen-paper.pdf>>, Bulletin of the IEEE Computer Society Technical Committee on Data Engineering, 2010. pp. 1-13.

Tsoukalas, et al., "PLEDS: A Personalized Entity Detection System Based on Web Log Mining Techniques", Retrieved at <<hUp:IIIeeexplore.Ieee.org/slamp/slamp.jsp?tp=

(56) References Cited

OTHER PUBLICATIONS

&amumber=4597039>>, The Ninth International Conference on Web-Age Information Management (WAIM), Jul. 20-22, 2008, pp. 389-396.
"Visual-Cue Refinement of User Query Results", U.S. Appl. No. 12/890,097, filed Sep. 24, 2010, pp. 28.
"Multi-Modal Approach to Search Query Input", U.S. Appl. No. 12/940,538, filed Nov. 5, 2010, pp. 44.
"Language Identification in Multilingual Text Background", U.S. Appl. No. 12/904,642, filed Oct. 14, 2010, pp. 30.
"An Interactive Framework for Name Disambiguation", U.S. Appl. No. 13/118,404, filed May 28, 2011, pp. 40.
International Search Report, mailed Mar. 29, 2013, received in peT Application No. PCT/US20124/061241.
L1, et al., "EntityEngine: Answering Entity-Relationship Queries using Shallow Semantics", Retrieved at <<http://www.eecs.umich.edul-congylworklcikm10demo.pdf>>, Proceedings of the 19th ACM Conference on Information and Knowledge Management. Oct. 26-30, 2010, pp. 2.
Demartini, et al., "A Model for Ranking Entities and Its Application to Wikipedia". Retrieved at <<http://www.I3s.deJweb/uploaclldocuments/111aweb08.pdf>>, Proceedings of the Latin American Web Conference, LA-WEB, Oct. 28-30, 2008, pp. 10.
Aleman-Meza. et at. "Ranking Complex Relationships on the Semantic Web". Retrieved at <<http://ieexploreJeee.org/stamp/stamp.jsp?amumber=01438303>>, IEEE Internet Computing. vol. 9, No. 3, May 2005. pp. 37-44.
Milton, et al., "On the Study of Data Modelling Languages using Chisholm's Ontology" Retrieved at <<http://citeseerx.ist.psu.edulviewdocJdownload?doi=1O.1.1.83.4956&rep=rep1&type=pdf>>, In Information Modelling and Knowledge Bases XIII, 2002, pp. 18.

Waitelonis, et al., "Semantically Enabled Exploratory Video Search", Retrieved at <<http://km.aifb.kit.edulws/semsearch10lFileslvideo.pdf, Semantic Search 2010 Workshop, Apr. 26-26, 2010, pp. 8.
U.S. Appl. No. 12/770,294, filed Apr. 29, 2010, Mital et al.
U.S. Appl. No. 12/770,272, filed Apr. 29, 2010, Mital et al.
U.S. Appl. No. 13/360,664, filed Jan. 28, 2012, Parakhin et al.
U.S. Appl. No. 13/285,002, filed Oct. 31, 2011, Viswanath.
"Supplementary Search Report Issued in European Patent Application No. 12845944.3", Mailed Date: May 4, 2015, 8 Pages.
Kopliku, et al., "Towards a Framework for Attribute Retrieval", In Proceedings of the 20th ACM Conference on Information and Knowledge Management, Oct. 24, 2011, 10 Pages.
McCown, et al., "Agreeing to Disagree: Search Engines and Their Public Interfaces", In Proceedings of the 7th Joint Conference on Digital Libraries, Jun. 17, 2007, 10 Pages.
Gerbolya, et al., "Web Application", Published on: Oct. 11, 2011, Available at: http://en.wikipedia.org/w/index.php?title=web_application&oldid=455096181.
Bhattacharyya et al., "Your Best might not be Good enough: Ranking in Collaborative Social Search Engines", 7th International Conference on Collaborative Computing: Networking, Applications and Worksharing (CollaborateCom), Oct. 15-18, 2011, pp. 87-94, Institute of Electrical and Electronics Engineers, USA.
State Intellectual Property Office of the P.R.C., "Office Action dated Feb. 1, 2016 in related Chinese Patent Application No. 201210582225.3", Feb. 1, 2016, China.
"First Office Action and Search Report Received for Chinese Patent Application No. 201210582225.3", Mailed Date: Jul. 1, 2015, 13 Pages.
"Supplementary Search Report Received for European Patent Application No. 12861350.2", Mailed Date: Jul. 1, 2015, 4 Pages.
"Inverted index—Wikipedia, the free encyclopedia", Retrieved on: Jun. 23, 2015, Available at http://web.archive.org/web/20111101221823/http://en.wikipedia.org/wiki/Inverted_index.

* cited by examiner

KNOWLEDGE-BASED ENTITY DETECTION AND DISAMBIGUATION

BACKGROUND

The Internet provides access to a vast amount of information. A major challenge given the quantity of information is how to find and discover information to provide a user with the most relevant information for a particular circumstance. The most common tool for doing this today is a keyword based search query provided to a search engine. The search engine matches received keywords to one or more words or phrases in a search index to identify documents, web pages, or other content that is potentially relevant to the user's query. For example, if a user searches for "dinosaurs" then the search engine provides the user a list of search results that are links to web pages that contain that term.

User queries often contain one or more entities (e.g., a person, location, or organization name) identified by name or properties associated with the entity. For example, one query might search for "Barack Obama", while another might search for "President of the United States". Both of these queries are looking for information related to a specific entity. Users may also search for locations, such as restaurants, banks, shopping centers, and so forth. Entities may include any type of nameable thing whether it is a business, person, consumer good or service, and so forth.

Today, when users search for a named entity using a search engine, the search engine presents assorted results that may be about a mixture of different entities with the same or similar names. For example, for the query "harry shum", one recent search engine returns pages about three different people in mixed order: positions 1, 3, 5, and 8 are about the Corporate Vice President at Microsoft's Online Services Division; positions 2, 4, 6, and 9 are about Harry Shum Jr., the American actor and dancer who plays Mike Chang in Glee; and position 7 is about yet another Harry who is a network support engineer at IP Systems. It is not actually clear from the user's query which of these people the user was trying to find, but it is likely that the user is only interested in one of them and that a large subset of the results are thus not relevant. The inability of search engines to resolve the underlying identities of entity instances in web pages hinders their ability to effectively organize search results.

SUMMARY

An entity-based search system is described herein that detects and recognizes entities in Internet-based content and uses this recognition to organize search results. The system associates one or more entity identifiers with a web page and stores this information as metadata of the page in a search engine index. This metadata will enable entity-based queries as well as rich data presentations in a search engine result page (SERP), including grouping results by entities, filtering results by one or more particular entities, or re-ranking search results based on user preference of entities. The system provides methods to detect entity instances in textual data, methods to generate a candidate disambiguation set for each entity instance based on a knowledge repository, methods to resolve the identity of an entity instance among the candidate disambiguation set, and methods to index the entity identifiers of disambiguated entities to allow entity-based retrieval and grouping of search results. Thus, the entity-based search system allows users to identify a particular entity the user is interested in finding, and to receive search results directly related to that entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 is a display diagram that illustrates sample results for a search for the term "Harry Shum", in one embodiment.

DETAILED DESCRIPTION

An entity-based search system is described herein that detects and recognizes entities in Internet-based content and uses this recognition to organize search results. One goal of entity detection and disambiguation is to tag named entities in webpages (or other types of textual data) with distinguished identifiers that unambiguously identify the entities. The system associates one or more entity identifiers with a web page and stores this information as metadata of the page in a search engine index. This metadata will enable entity-based queries as well as rich data presentations in a search engine result page (SERP), including grouping results by entities, filtering results by one or more particular entities, or re-ranking search results based on user preference of entities.

In some embodiments, the entity-based search system includes four high-level components: 1) a knowledge repository that stores a large number of known entities; 2) a named entity detector that detects entity instances in input query text and web document content; 3) an entity disambiguator that resolves the identifier of each entity instance; and 4) an entity indexer that indexes the entity identifiers that each unit of input text contains, and allows queries to be issued to retrieve the units of text that contain specific entities. With these high-level components, the system provides methods to detect entity instances in textual data, methods to generate a candidate disambiguation set for each entity instance based on a knowledge repository, methods to resolve the identity of an entity instance among the candidate disambiguation set, and methods to index the entity identifiers of disambiguated entities to allow entity-based retrieval and grouping of search results. Thus, the entity-based search system allows users to identify a particular entity the user is interested in finding, and to receive search results directly related to that entity.

Figure 1:
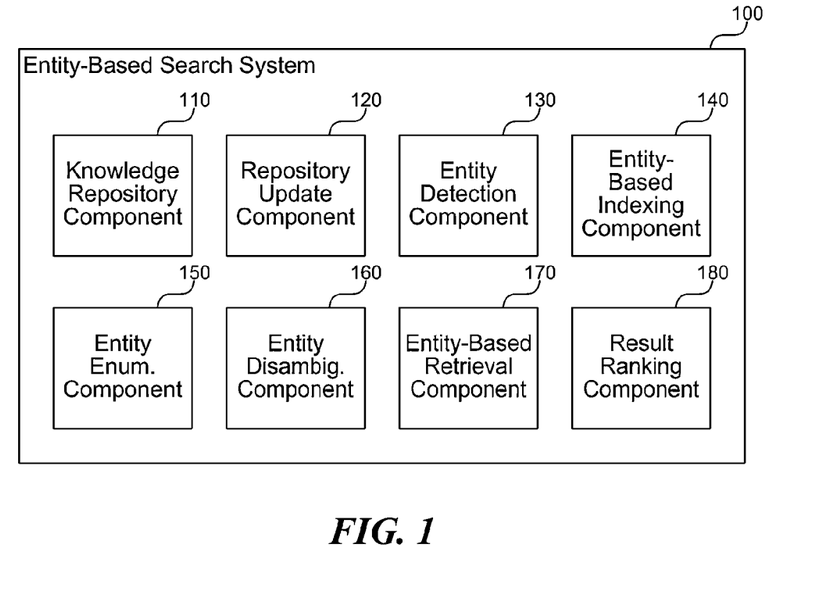
FIG. 1 is a block diagram that illustrates components of the entity-based search system, in one embodiment.

The following paragraphs describe the high-level components of the system in further detail, followed by a description of FIG. 1 that provides an example implementation of the system via software.

The first high-level component is a knowledge repository that includes a large, scalable repository of entities, their properties and relationships. The knowledge repository may be built up using a variety of techniques well known in the art, such as web crawling to find information, expert editors who contribute information to the repository, and so forth. The repository supports efficient queries on existing entities and relationships as well as insertion of new entities and relationships. The entities and their relationships can be represented as nodes and edges of a directed graph, which can be stored as triples in the form of subject-predicate-object entries in the repository (other storage schemes are also possible). The knowledge repository maintains a list of possible forms of appearances for each entity, and supports efficient retrieval of related entities based on exact or fuzzy string matches.

The next high-level component is a named entity detector. The named entity detector combines template-based and statistical entity extraction methods. For websites with well-defined structured or semi-structured pages (such as imdb.com, linkedin.com, amazon.com, and the like), the detector allows handcrafted templates to be used to extract entity instances from specific text elements of the webpage. For example, a particular website may be known to include pages with an entity named in the H1 hypertext markup language (HTML) tag, followed by descriptive text related to that entity (e.g., a movie page on imdb.com, a profile page on linkedin.com, a product page on amazon.com, and so forth). These sites change format infrequently and can be templatized (either automatically or via manual editing) for fast extraction of entity information.

For general webpages or other unstructured textual data, the system can employ a conditional random field (CRF), semi-Markov conditional random field (Semi-CRF), max-entropy, other statistical model, or regular expressions to identify entity instances. Specifically, if the input is an HTML document, an HTML parser can be used to remove markup tags from the document and extract plain text segments. Then the input text can be broken into a paragraphs and sentences based on HTML tags, punctuation, and line-breaks. Each sentence is further broken into a sequence of words. For each word in a sequence, a feature vector is computed based on the word itself and its contextual words (within an adjustable context window, such as two words before to two words after the current word). The feature vector may contain both typical lexical features such as word unigrams, bigrams, Unicode script type (Latin, Han, Cyrillic, and so on), character category (number, symbol, letter, and so on), whether the word is capitalized, all upper-case, all lower-case or mixed case, as well as features derived from known entities in the knowledge repository, such as person first, middle, and last name matches, organization name matches, location name matches, professional title matches, and so on. The sequence of feature vectors are fed into a model, which labels each word in the sequence as either nonentity or one of many predefined entity types (e.g., person, location, organization, professional title, and so forth). All words or word sequences that are labeled as entities are considered as entity instances for disambiguation.

The next high-level component is an entity disambiguator that performs an entity disambiguation process. The entity disambiguation process includes two high-level steps: entity candidate enumeration and candidate classification/ranking. Given an entity instance/name, the system queries the knowledge repository to retrieve a set of candidate entities and their attribute values. Then, the system computes a feature vector from the entity instance as well as each candidate entity. The types of features include: 1) the entity type as recognized by the entity detector; 2) the overlap between the possible attribute types of the entity instance and the attributes of each candidate entity; 3) similarity measures between the entity instance and the attributes of each candidate entry, such as Damerau-Levenshtein edit distance, Jaro-Winkler distance, and Jaccard distance; 4) similarity between the top co-occurring words within the context of the entity instance and those within the attribute values of each candidate entry; 5) the occurrence of related entities of each candidate entity within the context of the entity instance. The features are input to a classifier or scorer, such as a sparse boosted decision tree classifier to compute a matching score between each candidate entity and the input entity instance. In some embodiments, the identifier of the top-scored candidate entity is assigned to the input entity instance if the matching score exceeds a preset threshold. Other types of classifiers/rankers can also be used such as gradient boosted decision tree, gradient boosted ranker, support vector machines (SVM), and SVM-rank.

The next high-level component is an entity indexer that performs entity-based indexing and retrieval. In some embodiments, the identifier of each disambiguated entity instance is represented as an alphanumerical string and stored as a metaword in an inverted index. The metawords in the inverted index may be sorted alphabetically for efficient look up and retrieval. Each metaword can be associated with a list of integers that indicate the locations of the entity instances with the corresponding identifier. The documents or text units that contain any specific entity can be retrieved efficiently using its identifier by referencing the inverted index. Numerical metadata can be attached to each metaword to indicate the confidence of disambiguation, which can be used as a feature for query-dependent ranking of retrieval results.

FIG. 1 is a block diagram that illustrates components of the entity-based search system, in one embodiment. The system 100 includes a knowledge repository component 110, a repository update component 120, an entity detection component 130, an entity-based indexing component 140, an entity enumeration component 150, an entity disambiguation component 160, an entity-based retrieval component 170, and a result-ranking component 180. Each of these components is described in further detail herein.

The knowledge repository component 110 is a data store that stores information related to previously discovered entities and relationships between entities. The data store may include one or more files, file systems, hard drives, databases, storage area networks, cloud-based storage services, or other facilities for persistently storing entity information. The knowledge repository component 110 may include one or more interfaces through which users or software programs may add, delete, and update entity information, including information related to newly discovered entities. In some embodiments, the system 100 crawls the Internet periodically to discover and add entity information to the data store.

The repository update component 120 adds and updates entity information stored in the repository data store. The repository update component 120 is invoked to add new entities and relationships that are discovered during crawling, and to update changed or removed entities. In some cases, the entity detection component 130 invokes the repository update component 120 for each discovered entity to store discovered entity information for later matching to user queries. The component 120 may provide a variety of user, administrative, and programmatic interfaces for browsing, adding, removing, and updating entity information.

The entity detection component 130 receives discovered content and detects one or more entities embedded within the discovered content. For example, a web crawling engine may provide discovered web pages to the entity detection component 130 to extract any entities that are mentioned on each web page. The system may discover entities based on natural language processing, using known entities to expand knowledge of other entities, and by applying other textual or other content analysis techniques known in the art. The component 130 may operate on a variety of types of content, including textual, audiovisual, data, and so forth.

The entity-based indexing component 140 creates an index between detected entities and content related to the detected entities. The index may include the reverse index described above in which entity identifiers can be used to find content pages related to a particular entity identifier. The entity-based indexing component 140 may create and maintain a separate index or may build upon an existing index of content by adding appropriate metadata and lookup functions for accessing the index based on entities. Many search engines include existing keyword-based indexes that can be expanded to incorporate entity information and metadata for responding to entity-based queries. The entity detection component 130 invokes the entity-based indexing component 140 to add detected entities to the index. The system 100 may store the index in the knowledge repository or another data store associated with the system 100.

The entity enumeration component 150 receives a user query and enumerates previously detected entities that potentially match the query. The query may include one or more keywords and the entity enumeration may include matching keywords and/or phrases to keywords and/or phrases associated with each entity. For example, "Obama", "President of the United States", and "world leaders" may all match with an entity associated with the person Barack Obama. The entity enumeration component 150 may match any particular query to potentially many entities. It is the job of the entity disambiguation component 160 to then rank or select the most relevant from the enumerated entities. The entity enumeration component 150 accesses the knowledge repository and/or the entity-based index to identify matching entities based on stored information related to each entity.

The entity disambiguation component 160 classifies and ranks enumerated entities that potentially match the user query to qualify a relative level of match between various entities to the query. In some cases, the system may output a list of matching entities, potentially ordered by level of match, from which the user can select an entity representative of the user's present search purpose. Thus, in such a case, the system 100 provides potentially matching entities and the user provides disambiguation by selecting one from the potentially matching entities as the one that is most relevant. In other cases, the system 100 automatically selects a top entity or multiple top-ranked entities that match based on information in the search query. The search query may provide sufficient information to narrow down the level of match of potential entities to within a threshold level of matching, so that the system 100 has high certainty that a particular entity is the one the user is looking for. In other cases, the search query may provide insufficient information so that the system 100 elects to ask the user or apply other processes to determine one or more entities for which to provide search results.

The entity-based retrieval component 170 provides an interface through which the user can submit queries to search for information based on entities and receive entity-based search results. The entity-based retrieval component 170 may provide a front-end similar to a traditional search engine, which provides a search text box into which a user can enter a keyword-based query and submit the query to the search engine for identifying related results. However, the entity-based retrieval component 170 then invokes the entity enumeration component 150 to identify potentially matching entities, the entity disambiguation component 160 to rank enumerated entities, and the entity-based indexing component 140 to identify content results associated with sufficiently high-ranking entities. The system 100 may provide search results in one or more stages. For example, the system may first ask the user to select among multiple potential entities for which results are available and then may deliver results for an entity selected by the user, or the system may select for the user and combine such stages so the user receives results without intermediate user interface steps. In some cases, the system 100 provides results on the most likely entity and offers other available entities as links from which the user can select to view alternative results for another entity.

The result-ranking component 180 ranks the entity-based search results. The result-ranking component 180 may apply traditional search result ranking processes well known by those of ordinary skill in the art. In addition, the component 180 may rank results based on entity-based criteria, such as which entity (or entities) each result is associated with, a level of match between the user query and the entity associated with a result, historical query information of the user or other users (e.g., if the user was previously searching for presidents and then searched for "Lincoln", the user more likely means President Abraham Lincoln rather than Lincoln, Nebr. the city or Lincoln the automobile brand), and so forth.

The computing device on which the entity-based search system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
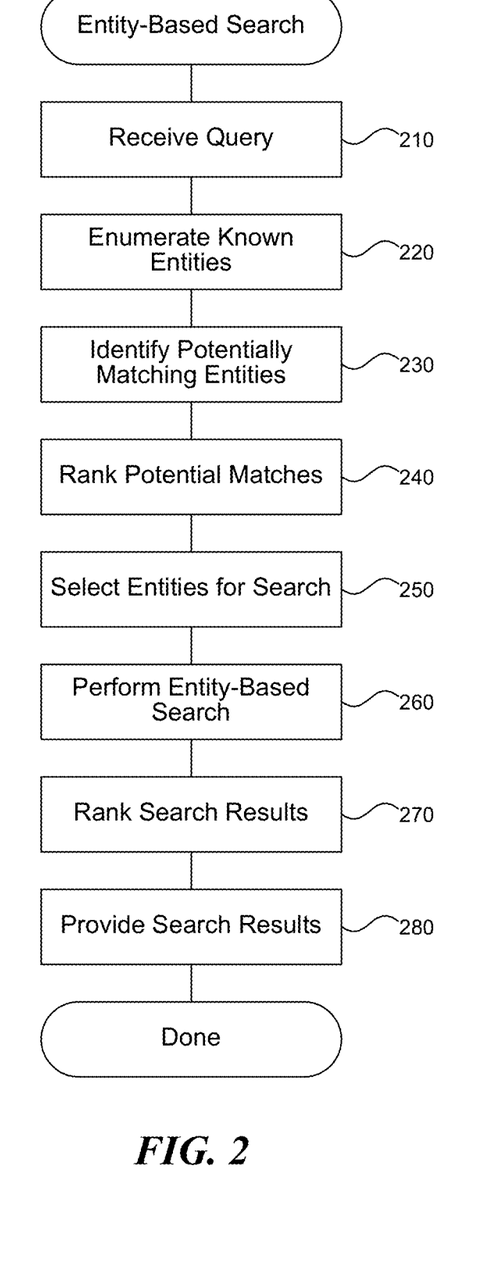
FIG. 2 is a flow diagram that illustrates processing of the entity-based search system to identify search results based on entity-based knowledge, in one embodiment.

FIG. 2 is a flow diagram that illustrates processing of the entity-based search system to identify search results based on entity-based knowledge, in one embodiment.

Beginning in block 210, the system receives a search query that includes one or more entities. The search may include a query string, structured data, or other form of query. The system may receive the query directly through a user interface (e.g., a web page or desktop search tool) or programmatically from another application or service that leverages the system for searches. The entity may be directly identified by name (e.g., McDonald's) or may be indirectly identified by property information (e.g., a fast food restaurant with golden arches). The query may also include additional information related to the user's purpose in submitting the query, such as whether the user is trying to find a location of a business, determine the annual revenue of the business, and so forth.

Continuing in block 220, the system enumerates one or more entities from an entity-based knowledge store that may match entities in the received query. The system may enumerate entities based on query keywords, natural language analysis, or other techniques that can score a relationship between the query and known entities in the knowledge store. The knowledge store contains entities discovered through crawling, expert data entry, or other techniques, such as those described with reference to FIG. 3.

Continuing in block 230, the system identifies one or more potentially matching entities from the enumerated entities, wherein a matching entity is one that may be a target of the query. The system may perform one or more initial steps to reduce the number of entities from the entire set of the knowledge store down to a more manageable subset. For example, the system may leverage an index of the data stored in the knowledge store to quickly identify entities that potentially match one or more entities in the received query.

Continuing in block 240, the system ranks the identified potentially matching entities to distinguish a relative level of match between each identified entity and one or more entities in the received query. In some cases, the system may separate potential entities in the query and identify a ranked set of matches for each potential entity. In other cases, the system may consider the query as a whole and rank a set of matches for all of the entities in the query. Ranking may include various well-known techniques for scoring a level of match between a given entity in the query and a candidate set of entities from the knowledge store.

Continuing in block 250, the system selects one or more of the identified potentially matching entities as matching entities with which to go forward with a search. Selecting may include displaying a user interface to the user for disambiguating which among a candidate set of entities the user intended for the search. For example, the system may display the ranked list of potentially matching entities to the user and ask the user to select one (or more). In other cases, the system may determine that the level of match for the highest ranked entity exceeds a threshold sufficient to automatically identify that entity as the matching entity. In other cases, the system may perform the following steps for multiple of the highest ranked potentially matching entities, so that the user is provided with results for the top identified entities.

Continuing in block 260, the system performs an entity-based search using one or more of the top ranked, selected matching entities. The search applies the identified entities as well as any additional information in the query to find search results relevant for the entities. The system may leverage a reverse index created during the discovery of entity information, which indexes from a known entity to a set of content pages or results that are most relevant for that known entity. For example, the knowledge store may track the most relevant pages discovered for each entity that can be provided as search results any time that entity is identified. The system may further refine the search results by finding the pages among those that also match any additional words or information in the currently received query. Unlike traditional keyword-based searches, the provided search results will be more relevant because the system first determined entities that are related to the received search, and may even have asked the user for further disambiguating information (e.g., by selecting an entity from a list of possibilities).

Continuing in block 270, the system ranks multiple results returned from the entity-based search to order the results by relevance to the received search query. The ranking may include a traditional ranking of results based on keyword matches, word closeness, and so forth based on comparing the original received query to the set of results returned from the entity-based search process. Although similar to traditional ranking steps, this step will produce results that are more accurate because it operates on a subset of data that is more relevant to the entity or entities identified by the received query, rather than all keyword-based matches to the query.

Continuing in block 280, the system provides the ranked search results in response to the received query. The system may provide search results via a user interface (e.g., a web page, desktop search tool, or mobile search tool) or programmatically to other applications that use search results. After block 280, these steps conclude.

Figure 3:
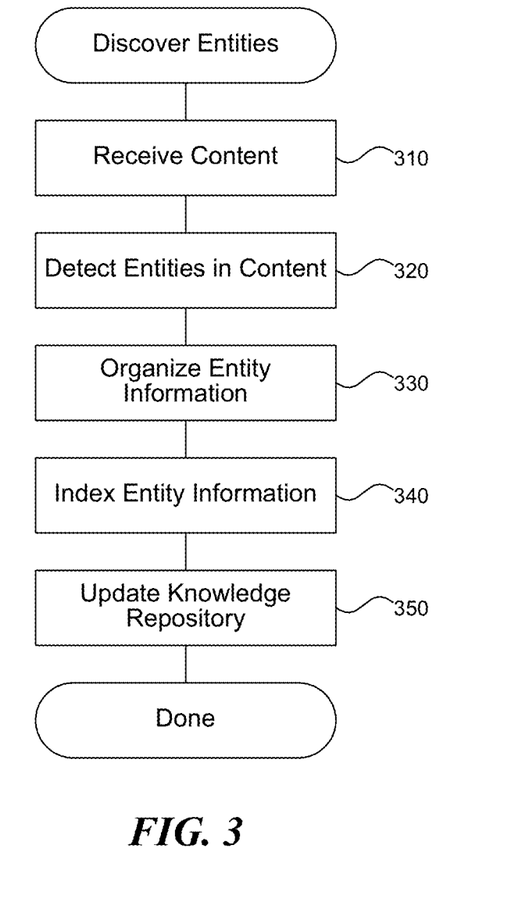
FIG. 3 is a flow diagram that illustrates processing of the entity-based search system to discover entities in a corpus of content, in one embodiment.

FIG. 3 is a flow diagram that illustrates processing of the entity-based search system to discover entities in a corpus of content, in one embodiment.

Beginning in block 310, the system receives information identifying a corpus of content. For example, the corpus may include information related to web pages derived from a web crawling process. The information may include links or Uniform Resource Identifiers (URIs) for one or more content items, such as web pages, documents, audiovisual files, and so forth. The system may receive the information by discovering the content internally or externally from a separate application that discovers available content. The system uses the content to build a knowledge repository of known entities for handling subsequent searches received from users of the system.

Continuing in block 320, the system detects one or more entities in the received content. The system may identify entities by keywords, contextual information, natural language processing, or other techniques for identifying information in a document or other content. In some cases, experts may provide manual entry of some entities and the system can use this information to derive other entities, such as by identifying words used close to and in relation to the known entities. The system scans the content and stores information describing the entities that are referred to within each content item.

Continuing in block 330, the system organizes the detected entity information to specify which content items refer to which entities. This allows the system to respond to later requests by providing particular content items that reference a given entity. In this way, the system allows users to search for content based on specified entities rather than simply by keywords or other textual information. The system may organize entity information in memory or may store various intermediate sets of data to persistent storage for further analysis, adding of metadata, and so forth.

Continuing in block 340, the system maintains an index that maps the detected entities to one or more content items that refer to each entity. The index provides an efficient data structure for later looking up content items once a given entity is identified for which a user seeks information. The index may include links to content items, contextual information describing how a particularly entity is used in the content item, an entity identifier or name, and so on. The system may store the index in the knowledge repository along with other entity information, or may distribute the index in other storage facilities for fast responses to search requests.

Continuing in block 350, the system updates a knowledge repository that stores entity information with information describing entities detected in the corpus of content and with the index. The knowledge repository may include a database or other storage facility with records that the system can create or update to store newly discovered entity information. For example, the system may maintain a database row for each entity with metadata describing known information related to the entity as well as a table of relationships between entities and content items. Those of ordinary skill in the art will recognize various storage mechanisms for storing such information for fast retrieval during client search requests. After block 350, these steps conclude.

FIG. 4 is a display diagram that illustrates sample results for a search for the term "Harry Shum", in one embodiment. In the example illustrated, a user has previously provided a search query where at least some of the keywords of the query indicate the name "Harry Shum". In response, the system has identified at least two entities that match the search request, a first entity related to Corporate Vice President at Microsoft by the name Harry Shum, and a second entity related to the American dancer and actor by the name of Harry Shum, Jr. The display includes a list of search results 410 that include a disambiguation control 420 and one or more matching result groups. The disambiguation control 420 provides a user interface for the user to explicitly identify one among several possible entities for which the user seeks information. In the absence of a user selection, the system can display results for multiple possible matching entities in groups as illustrated in this example. A first result group 430 includes a first result list 440 for the Corporate Vice President at Microsoft. Each of the results in the list 440 is specifically relevant to that entity. A second result group 450 includes a second result list 460 for the American actor. Results in this list 460 are specifically relevant to that entity. Thus, the user receives results that are relevant to specific entities and the user can provide information to narrow down the entities for which the user receives results to eliminate irrelevant result groups.

In some embodiments, the entity-based search system recognizes particular content sources as authoritative sources for discovering entity information. For example, the system may identify Wikipedia as having particularly strong and trustworthy entity information and may recognize various pages at that site as describing entities. The system may also recognize links between pages and links to authoritative sources as indicating the presence or possible presence of entity information in web or other content. In some cases, the system may store historical information such as which search result or results a user selected from a list of results in a previous search. The system may search content pages for key phrases, closeness of words, links to known pages, and so forth to detect possible entities. In some cases, the system identifies information other than page content, including click/anchor text, social signals (e.g., social network information), and other sources. The system tags or maps each page to a specific entity identifier (or multiple entity identifiers) that can be used to find the pages during subsequent entity-based searches.

In some embodiments, the entity-based search system leverages an available traditional search engine to find entity-based search results. After receiving a query and identifying particular entities, the system may re-query using a determined entity identifier to allow the search engine to find results specifically associated with a particular specified entity or entities. The identifier may include one or more additional keywords that disambiguate the entity to which the user is referring in the search request.

In some embodiments, the entity-based search system dynamically determines page entity identifiers after search results come in. For example, the system may compare results without an entity identifier to those with entity identifiers to place incoming results in appropriate groupings by entity. This may allow the system to include more results in response to a search than were previously discovered and catalogued according to entity.

In some embodiments, the entity-based search system augments search results with additional entity information. For example, for a particular person entity (e.g., provided as a heading of a search result group), the system may display information such as a person's name, social network friends, related pages, employer, personal web page, blog, and so forth. Where the entity's name may be ambiguous with other similarly named entities, this information helps the user to know to which of the multiple possible entities the results are related.

In some embodiments, the entity-based search system applies entity information for ranking standard search result output. Indexing, retrieving, and ranking by entities is discussed in detail herein. Another approach is to associate documents with entities, retrieve/rank the document results based on keyword relevance, and then organize/filter/re-rank the returned documents based on the entity information associated with those documents. For example, for query {harry shum}, the system can retrieve document research results first, find entities associated with each returned document, and then re-group the search results based on the entity information.

In some embodiments, the entity-based search system determines an entity for a document by comparing the document to other documents. Entity identification from documents and comparing the extracted entities to those entity candidates in the database is discussed in detail herein. Another approach for entity extraction/disambiguation from a document is to compare it to other documents that have been associated with some entities, and then identify and disambiguate the entities from the former document. For example, for a document that contains keyword "harry shum", the system might compare the document to the IMDB page describing the actor Harry Shum, a Wikipedia page about MICROSOFT™ corporate VP Harry Shum, and a LinkedIn page about an engineer Harry Shum. If the system finds the page is close to one of those pages associated with entities, the system can then map the "harry shum" in the first page to the entity associated with the matched page.

From the foregoing, it will be appreciated that specific embodiments of the entity-based search system have been described herein for purposes of illustration, but that various modifications may be made without deviating from the spirit and scope of the invention. Accordingly, the invention is not limited except as by the appended claims.

We claim:

1. A computer-implemented method to identify search results based on entity-based knowledge, the method comprising:
   receiving a search query that includes one or more entities;
   enumerating one or more entities from an entity-based knowledge store that may match entities in the received query;
   identifying one or more potentially matching entities from the enumerated entities, wherein a matching entity is one that may be a target of the query;
   ranking the identified potentially matching entities to distinguish a relative level of match between each identified entity and one or more entities in the received query;
   selecting one or more of the identified potentially matching entities as matching entities with which to go forward with a search;
   performing an entity-based search that narrows results by applying one or more top ranked, selected matching entities;
   ranking multiple results returned from the entity-based search so as to order the results by relevance to the received search query, by (i) dynamically determining entity identifiers by:
      identifying a first group of one or more results each without an entity identifier;
      identifying a second group of one or more results, different from the first group, each with an entity identifier; and
      comparing members of the first group with members of the second group, and then (ii) grouping results by entities with which the results are associated; and
   providing the ranked search results in response to the received query,
   wherein the preceding steps are performed by at least one processor.

2. The method of claim 1 wherein receiving the search query comprises receiving the query directly through a user interface.

3. The method of claim 1 wherein receiving the search query comprises receiving additional information related to a user's purpose in submitting the query.

4. The method of claim 1 wherein enumerating entities comprises accessing potentially matching entities based on query keywords or natural language analysis to score a relationship between the query and known entities in the knowledge store.

5. The method of claim 1 wherein identifying potentially matching entities comprises performing one or more initial steps to reduce the number of entities from the entire set of the knowledge store down to a subset relevant to the received query.

6. The method of claim 1 wherein ranking potentially matching entities comprises separating multiple potential entities in the query and identifying a ranked set of matches for each potential entity.

7. The method of claim 1 wherein ranking potentially matching entities comprises considering the query as a whole and rank a set of matches for all of the entities in the query.

8. The method of claim 1 wherein selecting matching entities for search comprises displaying a user interface to a user for disambiguating which among a candidate set of entities the user intended for the search.

9. The method of claim 1 wherein selecting matching entities for search comprises determining that the level of match for a highest ranked entity exceeds a threshold sufficient to automatically identify that entity as the matching entity for search.

10. The method of claim 1 wherein performing the entity-based search comprises applying the identified entities as well as any additional information in the query to find search results relevant for the identified entities.

11. The method of claim 1 wherein performing the entity-based search comprises leveraging a reverse index created during discovery of entity information, which indexes from a known entity to a set of content results that are most relevant for that known entity.

12. The method of claim 1 wherein performing the entity-based search comprises further refining the search results by finding the pages among those that also match any additional words or information in the currently received query.

13. The method of claim 1, wherein, in the providing, the ranked search results are provided in respective lists that reflect the grouping so that a respective result group is followed by an associated result list.

14. The method of claim 1, wherein the performing an entity-based search that narrows results by applying one or more top ranked, selected matching entities includes asking a user for a threshold level of matching to apply in the ranking.

15. The method of claim 1, wherein the providing the ranked search results in response to the received query includes providing a disambiguation control with a user interface that receives, from a user, explicit identification of an entity for which information is sought.

16. A computer system for knowledge-based entity detection and disambiguation, the system comprising
   a processor and memory configured to execute software instructions embodied within the following components:
   a knowledge repository component that stores information related to previously discovered entities and relationships between entities;
   a repository update component that adds and updates entity information stored in the knowledge repository component;
   an entity detection component that receives discovered content and detects one or more entities embedded within the discovered content;
   an entity-based indexing component that creates and maintains an index between detected entities and content related to the detected entities;
   an entity enumeration component that receives a user query and enumerates previously detected entities that potentially match the user query;
   an entity disambiguation component
   classifies and ranks enumerated entities that potentially match the user query to qualify a relative level of match between various entities to the user query;
   automatically select one or more top-ranked enumerated entities that match the user query based on information in the user query;
   an entity-based retrieval component that provides an interface through which a user can submit queries to search for information based on entities and receive entity-based search results; and a result-ranking component that ranks the entity-based search results provided to the user, by (i) dynamically determining entity identifiers by:
identifying a first group of one or more results each without an entity identifier;
identifying a second group of one or more results, different from the first group, each with an entity identifier; and
comparing members of the first group with members of second group, and then (ii) grouping results by entities with which the results are associated.

17. The system of claim 16 wherein the repository update component is invoked to add new entities and relationships that are discovered during crawling, and to update changed or removed entities.

18. The system of claim 16 wherein the entity detection component invokes the repository update component for each discovered entity to store discovered entity information for later matching to user queries.

19. The system of claim 16 wherein the entity detection component operates on a variety of types of content, including textual and audiovisual data.

20. The system of claim 16 wherein the entity-based index component provides a reverse index that maps entity identifiers to content pages related to a particular entity identifier.

21. The system of claim 16 wherein the entity disambiguation component outputs a list of matching entities ordered by level of match from which the user can select an entity representative of the user's present search target.

22. The system of claim 16, wherein the entity-based indexing component creates and maintains the index between detected entities and content related to the detected entities by (i) associating entity identifiers that each unit of input text contains with the content and (ii) storing information of the associating as metadata of the content, in the index.

23. A computer-readable storage medium comprising instructions for controlling a computer system to discover entities in a corpus of content, wherein the instructions, upon execution, cause a processor to perform actions comprising:
receiving a search query that includes one or more entities;
enumerating one or more entities from an entity-based knowledge store that may match entities in the received query;
identifying one or more potentially matching entities from the enumerated entities, wherein a matching entity is one that may be a target of the query;
ranking the identified potentially matching entities to distinguish a relative level of match between each identified entity and one or more entities in the received query;
selecting one or more of the identified potentially matching entities as matching entities with which to go forward with a search;
performing an entity-based search that narrows results by applying one or more of the top ranked, selected matching entities;
ranking multiple results returned from the entity-based search so as to order the results by relevance to the received search query, by (i) dynamically determining entity identifiers by:
identifying a first group of one or more results each without an entity identifier;
identifying a second group of one or more results, different from the first group, each with an entity identifier; and
comparing members of the first group with members of the second group, and then (ii) grouping results by entities with which the results are associated; and
providing the ranked search results in response to the received query.

* * * * *